(No Model.)
C. W. GEER.
CULINARY BOILER.
No. 316,257. Patented Apr. 21, 1885.
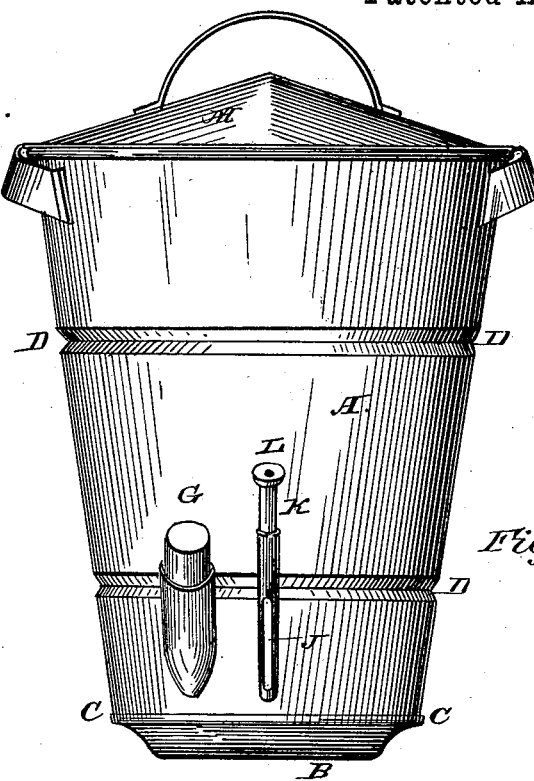
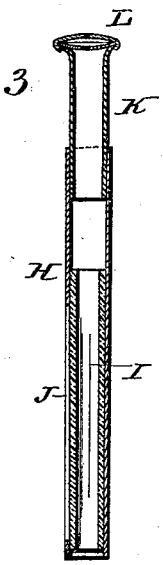
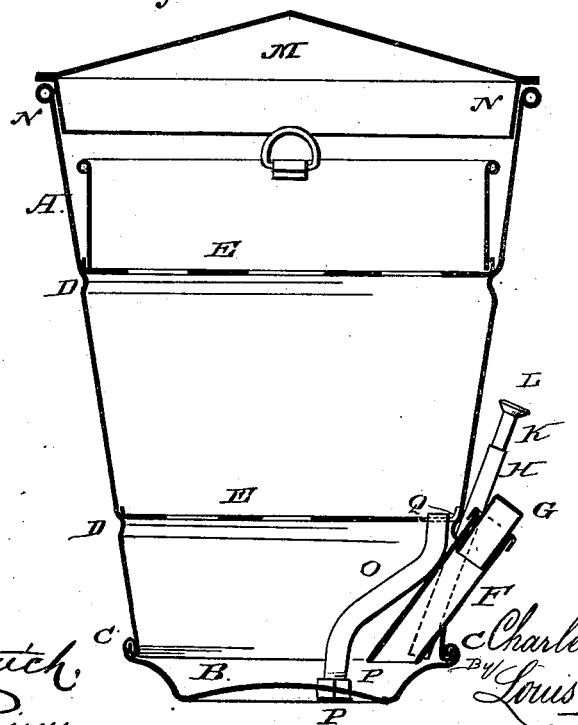
WITNESSES:
INVENTOR.
Charles W. Geer
By Louis Bagger & Co.,
ATTORNEYS.

UNITED STATES PATENT OFFICE.

CHARLES WALLACE GEER, OF BETHEL, CONNECTICUT.

CULINARY BOILER.

SPECIFICATION forming part of Letters Patent No. 316,257, dated April 21, 1885.

Application filed July 9, 1884. (No model.)

*To all whom it may concern:*

Be it known that I, C. W. GEER, a citizen of the United States, and a resident of Bethel, in the county of Fairfield and State of Connecticut, have invented certain new and useful Improvements in Culinary Boilers; and I do hereby declare that the following is a full, clear, and exact description of the invention, which will enable others skilled in the art to which it appertains to make and use the same, reference being had to the accompanying drawings, which form a part of this specification, and in which—

Figure 1 is a side view of my improved culinary boiler. Fig. 2 is a vertical section of the same; and Fig. 3 is a sectional detail view of the water gage and alarm.

Similar letters of reference indicate corresponding parts in all the figures.

My invention has relation to that class of culinary boilers in which the articles to be cooked are placed upon perforated shelves above the water-receptacle, allowing the said articles to be cooked by the steam; and it consists in the improved construction and combination of parts of the same, as hereinafter more fully described and claimed.

In the accompanying drawings, the letter A indicates the boiler, which is of the shape of an inverted truncated cone, and has a shouldered or stepped bottom, B, preferably of a metal stronger and more capable of resisting the effects of fire than the metal used for the sides of the boiler, the said sides being preferably sheet-tin and the bottom copper.

The bottom is connected to the lower edge of the sides by a doubled "rolled" joint, C, dispensing with the use of solder, which might melt by the heat of the fire, and the step of the bottom is such as to adapt it to fit in one of the standard sizes of holes in stoves.

The sides of the boiler have a number of horizontal corrugations, D, projecting inward, upon which corrugations the edges of a number of perforated trays or pans, E, may rest, upon which trays or pans the articles of food to be cooked may be placed and be cooked by the steam created from the water, which is filled in the bottom of the boiler through a pipe, F, opening through the side of the boiler near the bottom, and having its end extending nearly to the bottom of the boiler, while its upper end is provided with a removable cap, G, inserted with its open end in the end of the pipe, the said cap being thimble-shaped and adapted to be forced by the steam created within the boiler to bear with its free edges against the inner sides of the pipe, thus holding the cap or hollow plug firmly in the pipe.

A pipe, H, opens near the bottom of the boiler and passes through the side of the same, and is provided with a glass tube, I, at its lower portion, which is exposed through a longitudinal slot, J, serving as a water-gage, and the upper end of this pipe has a short pipe, K, inserted into it, which is provided with an alarm-whistle, L, which will be sounded if the water gets to be too low in the boiler so as to expose the lower end of the pipe, when steam will enter the pipe and sound the whistle.

M is the cover, which is provided with a downwardly-projecting conical flange, N, which fits into the open top of the boiler, the lower edge of the flange bearing firmly against the inner sides of the boiler, forming a steam-tight joint, which joint may be made tighter by simply pressing the cover farther down.

A pipe, O, passes through the bottom of the boiler, having a screw-thread upon that end, upon which screw-threaded end two nuts, P P, fit, bearing firmly against both sides of the bottom, securing the pipe firmly and tightly in the perforation in the bottom, and the upper end of the pipe extends inside the boiler above the lowermost tray, which has a notch, Q, in its edge for the passage of the pipe, and the said pipe serves to carry off all odors arising from the articles cooked within the boiler into the fire, preventing them from passing out into the room in which the cooking is done.

If desired, one or more extensions may be inserted into the top of the boiler, fitting in the same manner as the flange of the cover, thus rendering the capacity of the boiler greater; and it will be seen that the boiler may be filled to its required height through the supply-pipe by simply removing the cap or hollow plug, and it will also be seen that the alarm-whistle will give warning when it is necessary to fill the boiler. It will also be seen that all the odors accompanying cooking will be carried into the fire through the pipe for that purpose, thus avoiding all odor in the room in which the cooking takes place.

Having thus described my invention, I claim and desire to secure by Letters Patent of the United States—

The combination of the boiler having corrugations projecting inward, the pipe passing through the bottom of the boiler and secured thereto by means of two jamb-nuts and extending above the lowermost corrugation, and the lowermost tray having a notch in its edge for the passage of the pipe, as and for the purpose shown and set forth.

In testimony that I claim the foregoing as my own I have hereunto affixed my signature in presence of two witnesses.

CHARLES WALLACE GEER.

Witnesses:
 HOWARD H. WOODMAN,
 SAMUEL S. DUNNING.